US009105420B2

(12) United States Patent
Shah et al.

(10) Patent No.: US 9,105,420 B2
(45) Date of Patent: Aug. 11, 2015

(54) CYLINDRICAL ACTIVATION OF MENU BUTTONS

(75) Inventors: Dhaval N. Shah, Fremont, CA (US); Jared Mitchell Kole, San Jose, CA (US); Michael B. Wittenberg, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 358 days.

(21) Appl. No.: 13/608,624

(22) Filed: Sep. 10, 2012

(65) Prior Publication Data
US 2014/0069789 A1 Mar. 13, 2014

(51) Int. Cl.
| | |
|---|---|
| H01H 3/12 | (2006.01) |
| H01H 13/14 | (2006.01) |
| H01H 11/00 | (2006.01) |
| H01H 13/807 | (2006.01) |
| H04M 1/23 | (2006.01) |

(52) U.S. Cl.
CPC .............. *H01H 13/14* (2013.01); *H01H 11/00* (2013.01); *H01H 13/807* (2013.01); *H01H 3/12* (2013.01); *H01H 2215/012* (2013.01); *H01H 2221/026* (2013.01); *H01H 2225/028* (2013.01); *H04M 1/23* (2013.01); *Y10T 29/49105* (2015.01)

(58) Field of Classification Search
CPC ............. H01H 1/00; H01H 1/06; H01H 1/24; H01H 1/40; H01H 1/44; H01H 1/58; H01H 3/02; H01H 3/12; H01H 5/00; H01H 5/04; H01H 13/00; H01H 13/12; H01H 13/26; H01H 13/20; H01H 13/50; H01H 13/54; H01H 13/78; H01H 13/79; H01H 13/807; H01H 2003/00; H01H 2003/12; H01H 2100/00; H01H 2021/24; H01H 2027/022; H01H 2211/006; H01H 2217/012; H01H 2217/024; H01H 2217/028; H01H 2217/03; H01H 2221/093; H01H 2231/016; H01H 2233/05; H01H 2233/07; H01H 2239/074; H01H 2021/02
USPC ........... 200/345, 50.36, 51.16, 412, 453, 510, 200/520, 530, 302.2, 341
See application file for complete search history.

(56) References Cited

U.S. PATENT DOCUMENTS 2,451,176 A * 10/1948 Schellman ................. 200/302.2
4,348,556 A * 9/1982 Gettig et al. ................. 200/5 R
(Continued)

FOREIGN PATENT DOCUMENTS

EP 2511926 10/2012
WO WO00/31949 6/2000

OTHER PUBLICATIONS

International Search Report, PCT/US2013/058995, 7 pages, Dec. 20, 2013.

*Primary Examiner* — Edwin A. Leon
*Assistant Examiner* — Anthony R. Jimenez
(74) *Attorney, Agent, or Firm* — Brownstein Hyatt Farber Schreck, LLP (57) ABSTRACT

Cylindrical switch assemblies and methods of making the same are provided. Cylindrical switch assemblies can mitigate false presses by using switch assembly designs with vertically or near vertically mounted activation elements positioned around a perimeter of a button. The activation elements (e.g., switches) of the switch assemblies may be fixed to a vertical sidewall of a bracket and positioned such that a portion of the activation elements extend beneath the button. When the button is actuated by a user, the button activates the activation elements. Positioning multiple activation elements around the perimeter of the button ensures that the user can press anywhere on the button and still activate the activation elements.

42 Claims, 7 Drawing Sheets

(56) References Cited

U.S. PATENT DOCUMENTS

| | | | |
|---|---|---|---|
| 4,920,245 A * | 4/1990 | Takano et al. | 200/533 |
| 7,864,513 B2 | 1/2011 | Chen | |
| 8,446,713 B2 | 5/2013 | Lai | |
| 8,766,123 B2 * | 7/2014 | Hu et al. | 200/345 |
| 2005/0109602 A1 * | 5/2005 | Parkinson et al. | 200/511 |

* cited by examiner

CYLINDRICAL ACTIVATION OF MENU BUTTONS

BACKGROUND

This disclosure is directed to switch assemblies, and more particularly is directed to switch assemblies with vertically mounted and near vertically mounted activation elements.

Users can provide inputs to electronic devices (e.g., portable media players and cellular telephones) using many different approaches. Some known input components are conventional switch assemblies, which may include a stack up having a switch (e.g., a dome switch). Depending on design, a switch assembly stack up may contain several components. A conventional stack up of a switch assembly can include a dome switch having two leads that are soldered to a circuit board, and the circuit board is attached to a bracket. When the switch is pressed, an inner conductive surface of the switch contacts a contact pad on the circuit board to complete a circuit. In many cases, a cosmetic button is placed over the switch. In response to the user pressing the cosmetic button, the switch is in turn depressed and contacts the contact pad thereby generating an input.

In conventional switch assemblies, the circuit board and switch are typically positioned directly beneath the button. In some cases, a user may press on an edge of the cosmetic button (e.g., away from a center line of the button) in an attempt to actuate the switch. When force is applied to the edge of the button, the button may tilt and may contact another component of the electronic device before achieving activation of the switch. For example, the button may bottom out on the circuit board before activating the switch. In these cases, the user may experience a "false press" where the user believes input has been provided to the electronic device, but in fact the switch has not been activated. False presses may cause confusion and frustration.

Accordingly, there is a need for improved switch assemblies that mitigate false presses.

SUMMARY

Cylindrical switch assemblies and methods of making the same are provided. Cylindrical switch assemblies can mitigate false presses by using switch assembly designs with vertically or near vertically mounted activation elements positioned around a perimeter of a button. The switch assemblies may include a button and a bracket with a vertical sidewall. The bracket may surround the perimeter of the button. The activation elements (e.g., switches) of the switch assemblies may be fixed to the vertical sidewall and positioned such that a portion of the activation elements extend beneath the button. When the button is actuated by a user, the button activates the activation elements. Positioning multiple activation elements around the perimeter of the button ensures that the user can press anywhere on the button and still activate the activation elements.

In some embodiments, actuator arms may be attached to a bottom surface of the button. The actuator arms may be positioned to contact the activation elements when the button is actuated. In other embodiments, the button may include an angled sidewall that contacts the activation elements when the button is actuated. In embodiments that include a button with an angled sidewall, the sidewall of the bracket may also be angled to match the button. Angled sidewalls may provide more reliable activation of the activation elements.

In addition to mitigating false presses, embodiments of this invention may also utilize the interior space of an electronic device more efficiently. By mounting the activation elements on a sidewall of a bracket, space directly beneath the button may be made available for additional components (e.g., sensors) of the electronic device.

In one embodiment, a switch assembly for an electronic device may include a button, a bracket, a flexible printed circuit board, a dome switch, and an actuator arm. The button may include a peripheral edge defining an outer boundary of the button. The bracket can be offset from the peripheral edge of the button and the bracket may include a vertical wall. The flexible printed circuit board can be fixed to the vertical wall. The dome switch can be coupled to the flexible printed circuit board such that a portion of the dome switch extends beneath the button. The actuator arm can be fixed to a bottom surface of the button. The actuator arm may activate the dome switch when the button is actuated.

In another embodiment, a switch assembly for an electronic device may include a button, a bracket, a flexible printed circuit board, and a dome switch. The button may form an exterior surface of the electronic device and include a sidewall having an angled portion. The bracket can be positioned around a perimeter of the button. The flexible printed circuit board can be fixed to the bracket. The dome switch can be coupled to the flexible printed circuit board. The dome switch may be activated by the angled portion of the button when the button is actuated.

In yet another embodiment, an electronic device may include a housing, a button, a bracket, a flexible printed circuit board, and a dome switch. The housing may form an exterior surface of the electronic device and include an aperture. The button may be positioned within the aperture. The bracket can be coupled to an inner surface of the housing and may be offset from an outer periphery of the button. The bracket may include a vertical wall. The flexible printed circuit board can be mounted to the vertical wall. The dome switch can be coupled to the flexible printed circuit board such that the dome switch is activated by the button when the button is actuated.

In yet another embodiment, a method for constructing a switch assembly may include positioning a bracket having a vertical sidewall around an outer periphery of a button. The method may also include securing a flexible printed circuit board to the vertical sidewall. The method may further include coupling a dome switch to the flexible printed circuit board such that a portion of the dome switch extends beneath the button. The dome switch may be activated by the button when the button is actuated.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Switch assemblies with vertically mounted and near vertically mounted activation elements, and methods for making the same are described below with reference to FIGS. 1-6.

Figure 1:
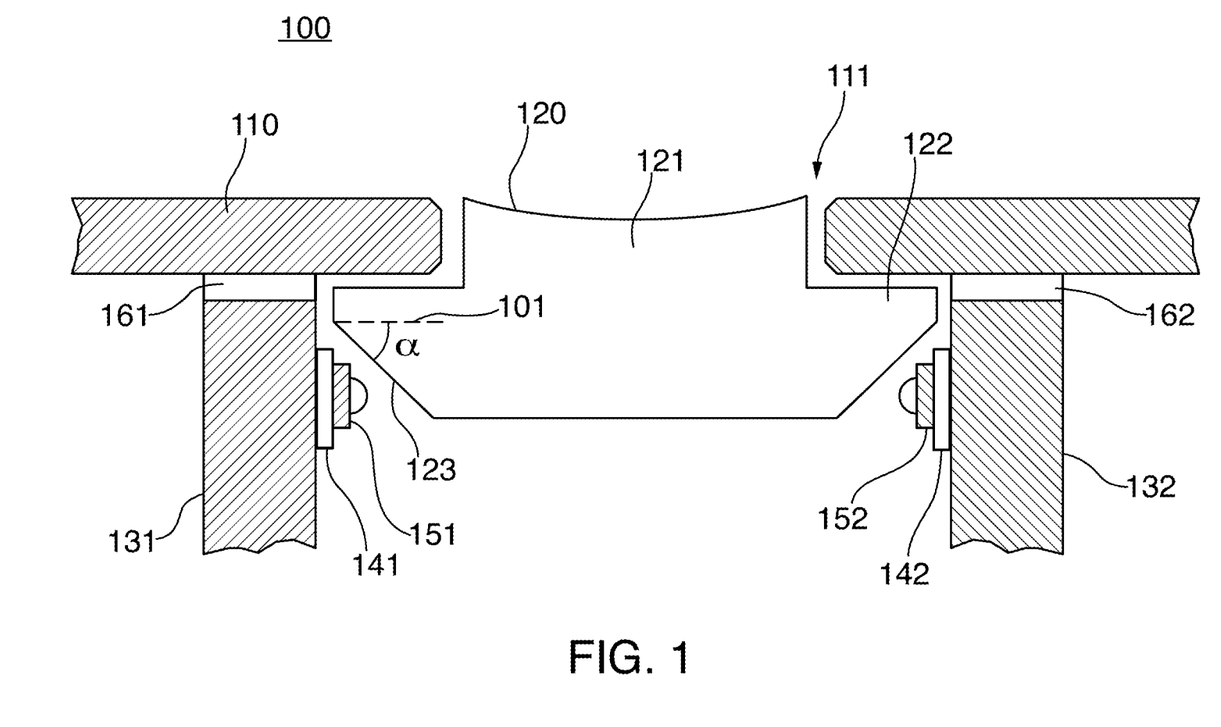
FIG. 1 shows a cross-sectional view of an illustrative electronic device including a switch assembly in accordance with an embodiment of the invention.

FIG. 1 shows a cross-sectional view of electronic device 100 in accordance with an embodiment of the invention. Electronic device 100 may be a portable media device (e.g., an iPod™ or iPhone™ available from Apple, Inc. of Cupertino, Calif.) or a personal media device accessory (e.g., a controller for a media device). Electronic device 100 may include housing 110, button 120, brackets 131 and 132, flexible printed circuit boards (PCB) 141 and 142, and dome switches 151 and 152. When a user presses button 120, dome switches 151 and 152 may be activated to provide an input to electronic device 100. The user can press button 120 to change an attribute of electronic device 100 (e.g., what is shown on a display of the device) or a functional state of device 100 (e.g., whether the device should power up or turn off). Although only two dome switches are shown, it is understood that electronic device 100 may include more than two dome switches. Additionally, although two brackets 131 and 132 are referenced, it is understood that brackets 131 and 132 can be formed by a single cylindrical bracket in some embodiments.

Housing 110 may form an exterior surface of electronic device 100. Housing 110 may include aperture 111 for accommodating button 120 of device 100. Housing 110 may be made from any suitable material. For example, housing 110 may be made from glass, plastic, metal, or any combination of these. In one embodiment, housing 110 is made of glass.

Button 120 may be positioned within aperture 111 of housing 110 and may form an external surface of electronic device 100. Button 120 may include cosmetic portion 121. Cosmetic portion 121 may extend through aperture 111 such that cosmetic portion 121 is accessible to a user of the device. The user may apply a force to cosmetic portion 111 in order to actuate button 110. Button 120 may also include flange portion 122. Flange portion 122 may extend from a sidewall of button 120. Flange portion 122 can engage portions of housing 110 and keep button 120 from passing through aperture 111 of housing 110. In this manner, flange portion 122 can secure button 120 to housing 110.

Button 120 may further include a sidewall with angled portion 123. Angled portion 123 may provide a surface for contacting dome switches 151 and 152 when button 120 is actuated. Angled portion 123 may form any suitable angle $\alpha$ with horizontal plane 101. For example in some embodiments, angle $\alpha$ may be 45 degrees. In other embodiments angle $\alpha$ may be greater than or less than 45 degrees. Providing button 120 with angled portion 123 may allow button 120 to activate dome switches 151 and 152 more reliably without damaging switches 151 and 152. Button 120 may be made from any suitable material, including, but not limited to, plastic, glass, and/or metal.

Brackets 131 and 132 may serve as a mounting surface for flexible PCBs 141 and 142. Brackets 131 and 132 may each include a vertical wall that flexible PCBs 141 and 142 can be fixed to. Brackets 131 and 132 can support the flexible PCBs when button 120 presses on dome switches 151 and 152. In this manner, brackets 131 and 132 may ensure that flexible PCBs 141 and 142 and dome switches 151 and 152 do not move or recede when force is applied to them. Brackets 131 and 132 may be attached to an inner surface of housing 110 using any suitable method. For example, brackets 131 and 132 may be attached using adhesives 161 and 162, respectively.

Flexible PCBs 141 and 142 may include traces for relaying switch events to another component of electronic device 100. For example, when switch events occur within dome switches 151 and 152, flexible PCBs 141 and 142 may relay the switch events to a processing unit (not shown) of electronic device 100. Flexible PCBs 141 and 142 may be shaped to fit around some or all of brackets 131 and 132. Dome switches 151 and 152 may be coupled to flexible PCBs 141 and 142 using any suitable approach, for example, via solder.

By mounting dome switches 151 and 152 around a perimeter of button 120, the resulting switch assembly can mitigate false presses. Regardless of where the user presses on cosmetic portion 121 of button 120, at least one of the dome switches of electronic device 100 will be activated. Thus, the user will not experience any confusion or frustration associated with false presses. Additionally, removing flexible PCBs 141 and 142 and dome switches 151 and 152 from beneath button 120 allows the space beneath button 120 to be used for another purpose. As a result, the interior space of electronic device 100 may be configured more efficiently. For example, the space beneath button 120 may accommodate another component of electronic device 100.

Figure 2:
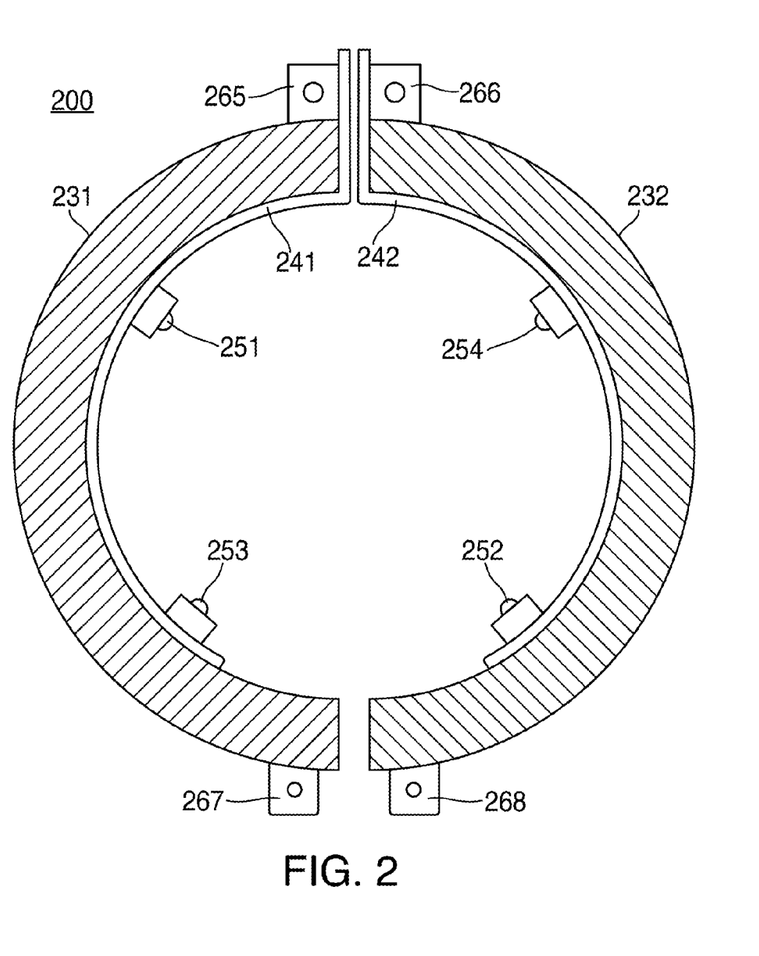
FIG. 2 shows a top cross-sectional view of an illustrative switch assembly in accordance with an embodiment of the invention.

FIG. 2 shows a top cross-sectional view of illustrative switch assembly 200 in accordance with an embodiment of the invention. For clarity, the button that would normally be a part of switch assembly 200 has been removed. Switch assembly 200 may be substantially similar to the switch assembly included in electronic device 100 of FIG. 1. As a result, similarly numbered elements of FIGS. 1 and 2 may share any features described with respect to them.

Switch assembly 200 may include a button (not shown), brackets 231 and 232, flexible PCBs 241 and 242, and dome switches 251-254. The button associated with switch assembly 200 may be circular. As a result, brackets 231 and 232 may be curved to correspond to the shape of the button. Although, brackets 231 and 232 are shown to be curved, it is understood that they may have any shape necessary to match a corresponding shape of the button. Additionally, in some embodiments, instead of being two separate elements, brackets 231 and 232 may instead be formed by a single element. Flexible PCBs 241 and 242 may be fixed to an inner surface of brackets 231 and 232. The flexible PCBs may conform to the shape of the brackets. Dome switches 251-254 may be secured to flexible PCBs 241 and 242 at various locations using any suitable method. For example, dome switches 251-254 may be soldered to flexible PCBs 241 and 242. Although four dome switches are shown in FIG. 2, it is understood that any suitable number of dome switches can be used. In some embodiments, brackets 231 and 232 may include screw plates 265-268. Screw plates 265-268 may secure brackets 231 and 232 to a housing or other component of an electronic device.

Figure 3A:
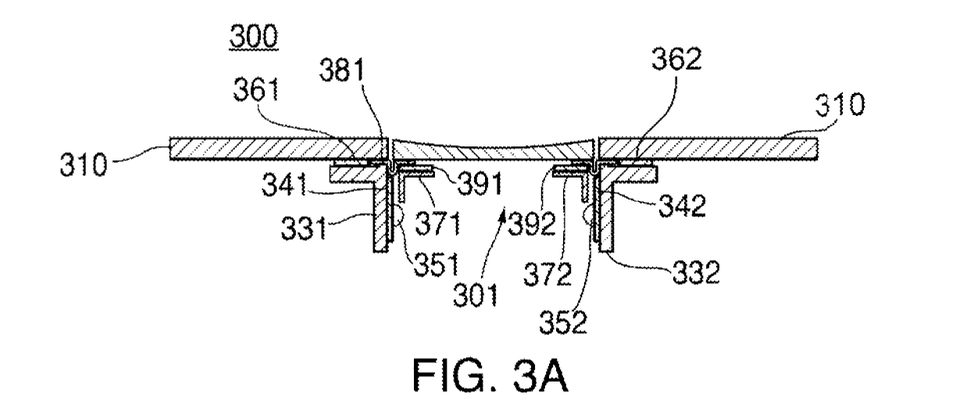
FIG. 3A shows a cross-sectional view of another exemplary electronic device including an illustrative switch assembly in accordance with an embodiment of the invention.
Figure 3B:
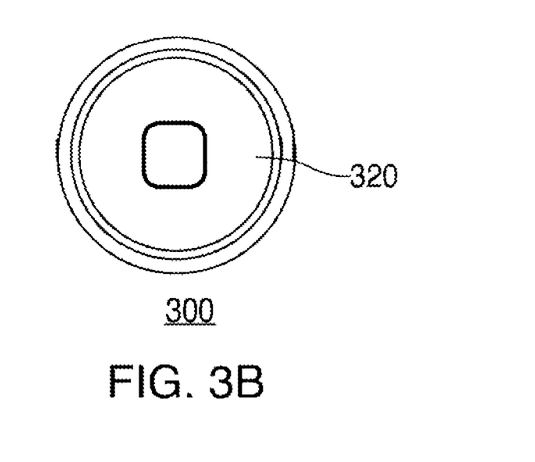
FIG. 3B shows a top view of the button of FIG. 3A in accordance with an embodiment of the invention.

FIGS. 3A and 3B show views of another exemplary electronic device including an illustrative switch assembly in accordance with an embodiment of the invention. In particular, FIG. 3A shows a cross-sectional view of electronic device 300 and FIG. 3B shows a top view of the button of FIG. 3A. Electronic device 300 may include housing 310, button 320, brackets 331 and 332, flexible PCBs 341 and 342, dome switches 351 and 352, and actuator arms 371 and 372. Electronic device 300 may be substantially similar to electronic device 100 of FIG. 1. As a result, electronic device 300 may share any features described with respect to electronic device 100, and vice versa.

As shown in FIG. 3A, button 320 may fit within an opening of housing 310. Brackets 331 and 332 may be positioned adjacent to the opening and may be fixed to housing 310 using adhesives 361 and 362. Flexible PCBs 341 and 342 may be attached to brackets 331 and 332. Dome switches 351 and 352 may be secured to flexible PCBs 341 and 342.

In some embodiments, actuator arms 371 and 372 may be attached to button 320. Actuator arms 371 and 372 may align with dome switches 351 and 352, and may activate the dome switches when button 320 is actuated. Actuator arms 371 and 372 may be attached to button 320 using a glue or an adhesive (e.g., adhesives 391 and 392). In some embodiments, actuator arms 371 and 372 may instead be molded as part of button 320. Using actuator arms 371 and 372 may maximize the space available in cavity 301. For example, actuator arms 371 and 372 may be shaped to follow an outer contour of cavity 301 so that they occupy as little of cavity 301 as possible.

In some embodiments, electronic device 300 may include seal 381. Seal 381 may be coupled to button 320 and housing 310. Seal 381 may provide a water tight seal that prevents foreign liquids or other debris from entering electronic device 300. Seal 381 may be made from any suitable compliant material. For example, seal 381 may be formed from silicone.

Figure 4:
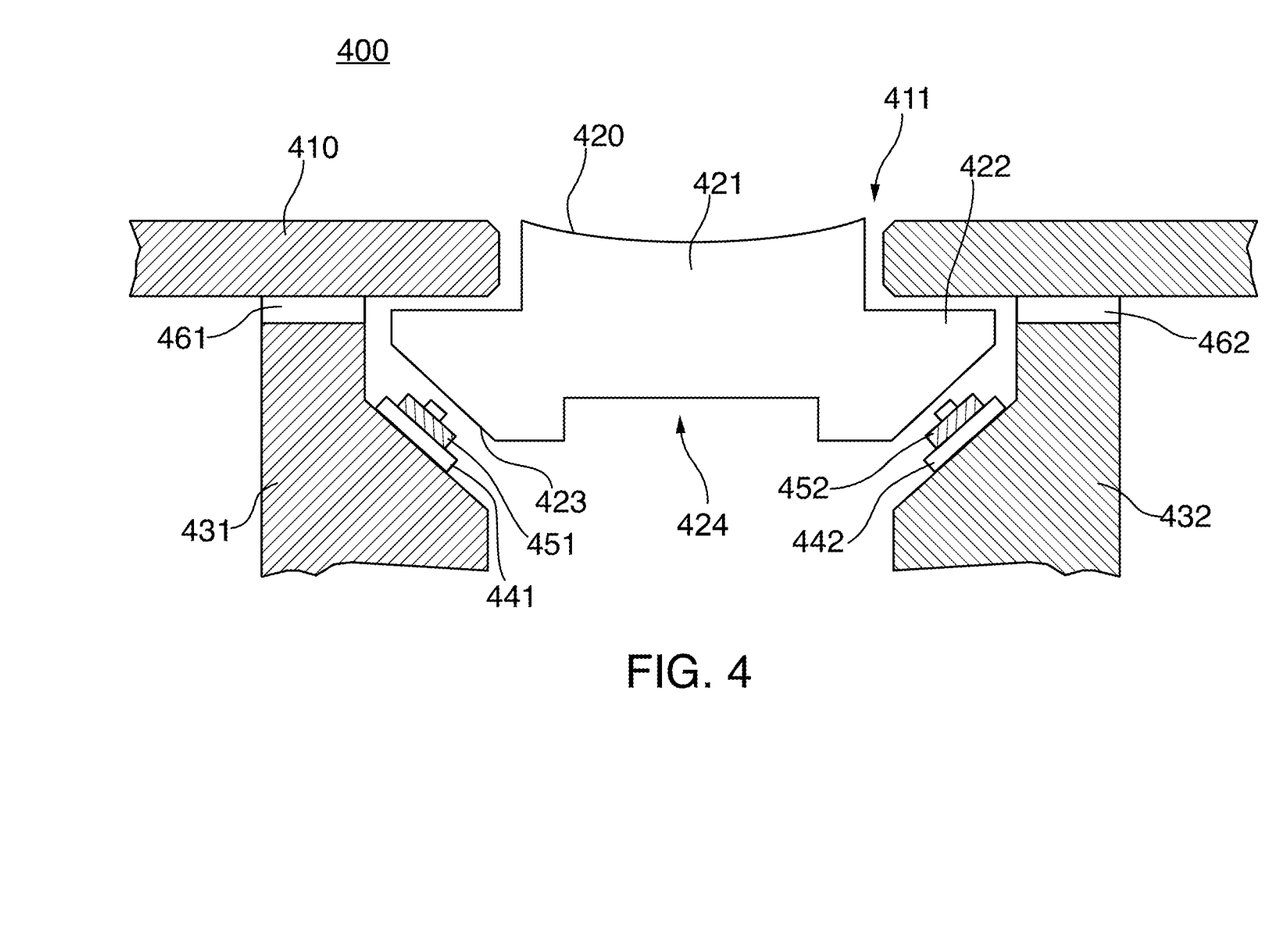
FIG. 4 shows a cross-sectional view of yet another exemplary electronic device including an illustrative switch assembly in accordance with an embodiment of the invention.

FIG. 4 shows a cross-sectional view of yet another exemplary electronic device including an illustrative switch assembly in accordance with an embodiment of the invention. Electronic device 400 may include housing 410, button 420, brackets 431 and 432, flexible PCBs 441 and 442, and dome switches 451 and 452. Electronic device 400 may be substantially similar to electronic device 100 of FIG. 1. As a result, electronic device 400 may share any features described with respect to electronic device 100, and vice versa.

As shown in FIG. 4, button 320 may fit within opening 411 of housing 410. Flange portion 422 of button 420 may engage housing 410 and help retain button 420 within opening 411. Brackets 431 and 432 may be positioned adjacent to opening 411 and may be fixed to housing 410 using adhesives 461 and 462.

In some embodiments, brackets 431 and 432 may include an angled sidewall. Flexible PCBs 441 and 442 may be attached to the angled sidewall of brackets 431 and 432. Dome switches 451 and 452 may be secured to flexible PCBs 441 and 442. The angled sidewalls may have any suitable angle, including substantially the same angle as angled portion 423 of button 420. Embodiments that include brackets with angled sidewalls may achieve easier and more reliable actuation of dome switches 451 and 452.

In some embodiments, button 420 may include cutout 424 in a bottom surface. Cutout 424 may provide additional space to accommodate another component of electronic device 400. Although cutout 424 is shown as being substantially rectangular, it is understood that cutout 424 can have any suitable shape.

Figure 5A:
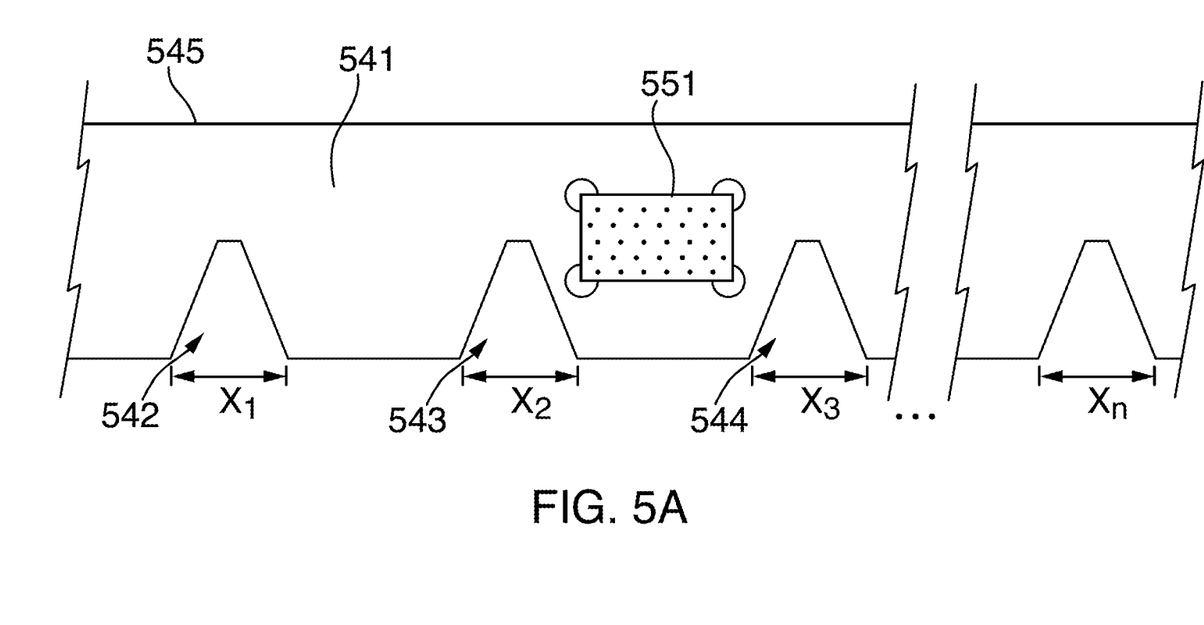
FIG. 5A shows a top view of an illustrative flexible printed circuit board in accordance with an embodiment of the invention.
Figure 5B:
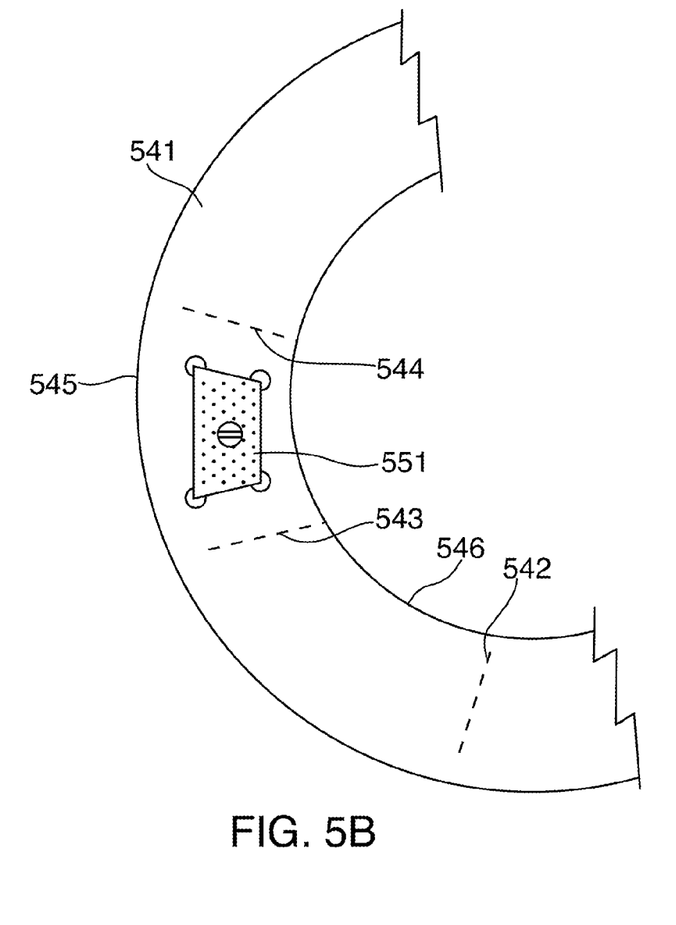
FIG. 5B shows a top view of the flexible printed circuit board of FIG. 5A in accordance with an embodiment of the invention.

Referring now to FIGS. 5A and 5B, various views of an illustrative flexible printed circuit board are shown in accordance with an embodiment of the invention. In particular, FIG. 5A shows a top view of flexible PCB 541 lying flat and FIG. 5B shows a top view of flexible PCB 541 in an assembled state such that it takes a semi-circular shape. Dome switch 551 may be coupled to flexible PCB 541. Flexible PCB 541 may be substantially similar to flexible PCB 441 or 442 of FIG. 4. As a result, flexible PCB 541 may share any features described with respect to flexible PCB 441, and vice versa.

Referring briefly back to FIG. 4, in some embodiments, a flexible PCB (e.g., flexible PCB 441) may need to follow a curved, angled surface (e.g., the angled sidewall of bracket 431). Thus, in order to help flexible PCB 541 achieve a desired final shape, flexible PCB 541 may include shaped cutouts. For example, referring back to FIGS. 5A and 5B, flexible PCB 541 may include cutouts 542-544. Cutouts 542-544 may help flexible PCB 541 achieve a curved, angled shape without folding or buckling.

The number, size, and shape of cutouts 542-544 may be chosen based on the size and shape of a switch assembly it will be incorporated in. For example, the length of outer edge 545 may be chosen based on a first diameter of a bracket (e.g., a first diameter of the angled sidewall of bracket 431). The width of cutouts 542-544 (e.g., $x_1$, $x_2$, and $x_3$, respectively) may then be chosen based on a second diameter of the bracket. Once assembled into its final shape, flexible PCB 541 will have an outer diameter equal to the length of edge 545 and an inner diameter equal to the length of edge 545 less the sum of the width of cutouts 542-544 (i.e., the result will be an inner diameter shown as edge 546). Although only three cutouts are discussed, it is understood that any suitable number of cutouts may be used within the scope of this disclosure.

Figure 6:
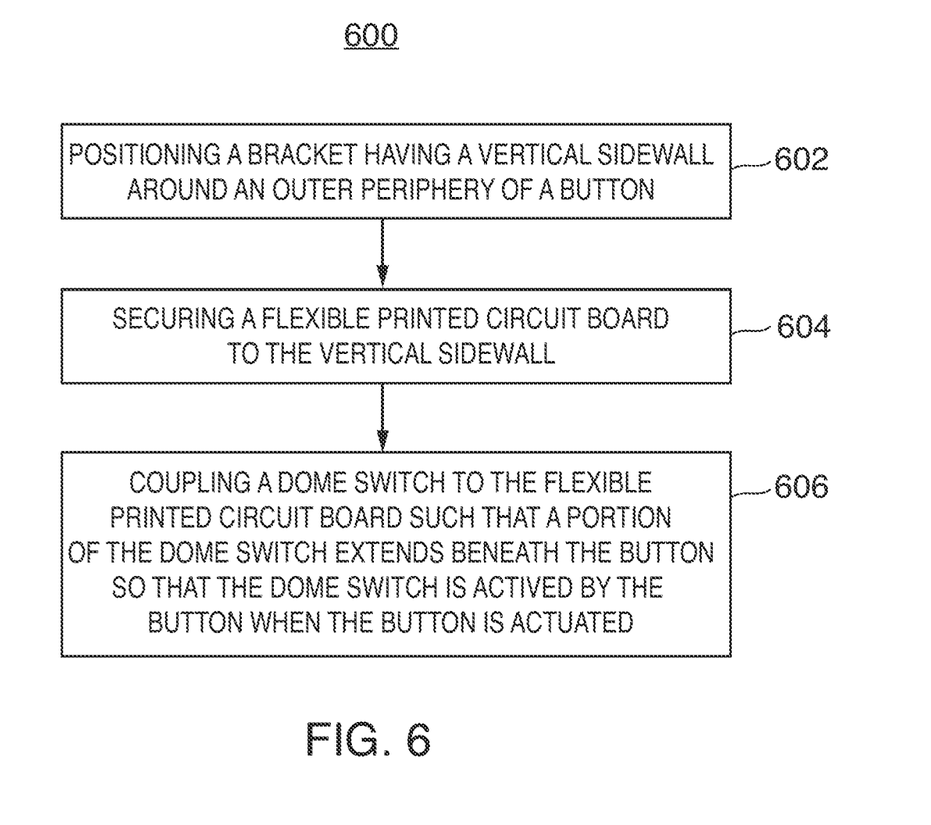
FIG. 6 shows an illustrative method for assembling a switch assembly in accordance with some embodiments of the invention.

FIG. 6 shows an illustrative method for constructing a switch assembly in accordance with some embodiments of the invention. Method 600 may begin at step 602. At step 602, a bracket having a vertical sidewall may be positioned around an outer periphery of a button. For illustrative purposes, the bracket and button may be similar to bracket 331 and button 320 of FIG. 3. At step 604, a flexible PCB (e.g., similar to flexible PCB 341) may be secured to the vertical sidewall of the bracket.

At step 606, a dome switch (e.g., similar to dome switch 351) may be coupled to the flexible PCB. The dome switch may be positioned such that a portion of the switch extends beneath the button. When the button is actuated, the dome switch may be activated by the button. The resulting configuration may look similar to the switch assembly of FIG. 3. Although the method for constructing a switch assembly is presented using sequentially numbered steps, it is understood that the order of the steps may be altered without deviating from the scope of this disclosure.

As used herein, the term "electronic device" can include, but is not limited to, music players, video players, still image players, game players, other media players, music recorders, video recorders, cameras, other media recorders, radios, medical equipment, calculators, cellular telephones, other wireless communication devices, personal digital assistants, programmable remote controls, pagers, laptop computers, printers, or combinations thereof.

The previously described embodiments are presented for purposes of illustration and not of limitation. It is understood that one or more features of an embodiment can be combined with one or more features of another embodiment to provide systems and/or methods without deviating from the spirit and scope of the invention. It will also be understood that various directional and orientational terms are used herein only for convenience, and that no fixed or absolute directional or orientational limitations are intended by the use of these words.

For example, the devices of this invention can have any desired orientation. If reoriented, different directional or orientational terms may need to be used in their description, but that will not alter their fundamental nature as within the scope and spirit of this invention. Those skilled in the art will appreciate that the invention can be practiced by other than the described embodiments, which are presented for purposes of illustration rather than of limitation, and the invention is limited only by the claims which follow.

What is claimed is:

1. A switch assembly for an electronic device, the switch assembly comprising:
a button, the button comprising a peripheral edge defining an outer boundary of the button;
a bracket offset from the peripheral edge of the button, the bracket comprising a vertical wall;
a flexible printed circuit board fixed to the vertical wall;
a switch coupled to the flexible printed circuit board, a portion of the switch extending beneath the button; and
an actuator arm fixed to a bottom surface of the button, the actuator arm operative to activate the switch when the button is actuated.

2. The switch assembly of claim 1, further comprising a seal coupled to the button and the bracket, the seal operative to prevent foreign substances from entering an interior space defined by the switch assembly.

3. The switch assembly of claim 1, wherein the outer boundary of the button is substantially circular, and wherein the vertical wall of the bracket is curved.

4. The switch assembly of claim 1, wherein the bracket, flexible printed circuit board, and switch define a cavity beneath the button.

5. The switch assembly of claim 1, wherein the actuator arm is fixed to the bottom surface using an adhesive.

6. A switch assembly for an electronic device, the switch assembly comprising:
a button including a user-interface surface forming an exterior surface of the electronic device, the button comprising a downward facing surface that forms a nonzero angle with respect to a plane defined by the user-interface surface;
a bracket positioned around a perimeter of the button, wherein the bracket comprises an upward facing switch surface facing the downward facing surface of the button;
a flexible printed circuit board fixed to the switch surface of the bracket; and
a dome switch coupled to the flexible printed circuit board, wherein the dome switch is situated so as to be compressed between the downward facing surface of the button and the switch surface when the button is actuated.

7. The switch assembly of claim 6, wherein the bracket comprises a vertical wall and the flexible printed circuit board is fixed to the vertical wall.

8. The switch assembly of claim 6, wherein the bracket comprises an angled wall and the flexible printed circuit board is fixed to the angled wall.

9. The switch assembly of claim 8, wherein the downward facing surface and the angled wall are substantially parallel.

10. The switch assembly of claim 8, wherein the flexible printed circuit board comprises at least one cutout.

11. The switch assembly of claim 6, wherein a bottom surface of the button comprises a cutout.

12. The switch assembly of claim 6, wherein the bracket comprises a screw plate.

13. An electronic device, comprising:
a housing including an aperture; and
a switch assembly, comprising:
a bracket mounted to the housing, the bracket defining a cavity and comprising a cylindrical wall extending in a direction perpendicular to a first surface of the housing;
at least two dome switches mounted on the cylindrical wall; and
a button positioned within the aperture and the cavity, the button comprising:
a user-interface surface forming an exterior surface of the electronic device; and
a downward facing surface that forms a nonzero angle with respect to a plane defined by the user-interface surface;
wherein the downward facing surface of the button is operative to engage at least one of the at least two dome switches when actuated.

14. The electronic device of claim 13, wherein the button comprises a flange portion operative to help retain the button within the aperture.

15. The electronic device of claim 13, wherein the cavity is operative to receive another component of the electronic device.

16. The electronic device of claim 13, further comprising a seal coupled to the button and an interior surface of the housing, the seal operative to prevent foreign substances from entering the electronic device.

17. The electronic device of claim 13, wherein the bracket comprises an angular portion that is not perpendicular to a first surface of the housing, and the at least two switches are mounted to the angular portion.

18. The electronic device of claim 17, wherein the angular portion of the bracket and the downward facing surface of the button are substantially parallel.

19. A method for constructing a switch assembly, the method comprising:
positioning a bracket having a vertical sidewall around an outer periphery of a button;
securing a flexible printed circuit board to the vertical sidewall; and
coupling a dome switch to the flexible printed circuit board such that a portion of the dome switch extends beneath the button, wherein the dome switch is activated by the button when the button is actuated.

20. The method of claim 19, further comprising coupling a seal to the bracket and a bottom surface of the button.

21. The method of claim 19, wherein the outer periphery is substantially circular, and wherein the vertical wall is shaped to follow the outer periphery.

22. A switch assembly for a device, the switch assembly comprising:
a button, the button comprising a first vertical sidewall having a side contact portion;
a housing positioned at least partially around the button, the housing comprising a second vertical sidewall; and
at least one dome switch coupled to the second vertical sidewall and facing the side contact portion;
wherein the button is manipulatable to activate the at least one dome switch by contacting the dome switch with the side contact portion.

23. The switch assembly of claim 22, wherein the button is manipulatable to activate the at least one dome switch by applying a force to the button.

24. The switch assembly of claim 22, wherein the side contact portion and the second vertical sidewall are substantially parallel.

25. The switch assembly of claim 22, wherein the button is manipulatable to activate the at least one switch by applying a force to a side of the button.

26. The switch assembly of claim 22 wherein the button is positioned at least partially within a cavity of the housing.

27. The switch assembly of claim 22, wherein the button comprises a button head.

28. The switch assembly of claim 27, wherein the button is manipulatable to activate the at least one switch by applying a force to one side of the button head.

29. A device, comprising:
a housing;
a button positioned at least partially within the housing, the button comprising:
    a first cylindrical portion having a first diameter, the first cylindrical portion defining a button head;
    a second cylindrical portion having a second diameter larger than the first diameter, the second cylindrical portion configured to be disposed within the housing and having:
        a retaining surface that extends substantially perpendicularly outward from a side of the first cylindrical portion, wherein the retaining surface is configured to contact an inner surface of the housing so as to retain the button at least partially within the housing; and
        a first vertical sidewall having a side contact portion; and
at least one dome switch coupled to a surface of the housing facing the side contact portion;
wherein the button is manipulatable to activate the at least one dome switch by contacting the dome switch with the side contact portion.

30. The device of claim 29, wherein the button is manipulatable to activate the at least one switch utilizing the side contact portion by applying a force to a side of the button head.

31. The device of claim 29, wherein the button is positioned at least partially within a cavity of the housing.

32. The device of claim 31, wherein the surface of the housing comprises a second vertical sidewall of the cavity.

33. The device of claim 29, wherein the button is manipulatable to activate the at least one switch utilizing the side contact portion by applying a force to a side of the button.

34. The device of claim 29, wherein the surface of the housing comprises a second vertical sidewall.

35. The device of claim 34, wherein the side contact portion and the second vertical sidewall are substantially parallel.

36. The device of claim 29, wherein the button is manipulatable to activate the at least one switch by applying a force to the button.

37. A method for constructing a switch assembly, comprising:
positioning a button at least partially within a housing, the button comprising a first vertical sidewall having a side contact portion, and the housing comprising a second vertical sidewall that is substantially parallel to the first vertical sidewall; and
coupling at least one dome switch to the second vertical sidewall such that the at least one dome switch faces the side contact portion, wherein the button is manipulatable to contact the at least one dome switch with the side contact portion.

38. A method of operating a button, comprising:
manipulating a button that is positioned at least partially within a housing and comprises a first vertical sidewall having a side contact portion, the housing comprising a second vertical sidewall that is substantially parallel to the first vertical sidewall;
contacting at least one dome switch coupled to the second vertical sidewall of the housing with the side contact portion in response to the manipulation; and
activating the at least one dome switch in response to the contacting.

39. The switch assembly of claim 6, wherein the downward facing surface of the button is an outer surface of a frusto-conical portion of the button.

40. The switch assembly of claim 39, wherein the upward facing switch portion is an interior surface of a frusto-conical portion of the bracket.

41. The electronic device of claim 13, wherein the downward facing surface of the button is an outer surface of a frusto-conical portion of the button.

42. The electronic device of claim 13, the switch assembly comprising at least four dome switches mounted on the cylindrical wall, wherein the at least four dome switches are equally spaced apart around the cylindrical wall.

* * * * *